(12) United States Patent
Burkhardt et al.

(10) Patent No.: US 12,032,160 B2
(45) Date of Patent: Jul. 9, 2024

(54) DATA PROJECTION SYSTEM

(71) Applicant: Carl Zeiss Jena GmbH, Jena (DE)

(72) Inventors: Matthias Burkhardt, Eichenberg (DE); Christoph Erler, Jena (DE); Alexandre Gatto, Jena Muenchenroda (DE)

(73) Assignee: Carl Zeiss Jena Gmbh, Jena (DE)

( * ) Notice: Subject to any disclaimer, the term of this patent is extended or adjusted under 35 U.S.C. 154(b) by 605 days.

(21) Appl. No.: 17/202,491

(22) Filed: Mar. 16, 2021

(65) Prior Publication Data
US 2021/0239977 A1 Aug. 5, 2021

Related U.S. Application Data

(62) Division of application No. 15/559,209, filed as application No. PCT/EP2016/055710 on Mar. 16, 2016, now Pat. No. 11,073,691.

(30) Foreign Application Priority Data

Mar. 18, 2015 (DE) ............... 10 2015 104 085.9

(51) Int. Cl.
*G02B 26/12* (2006.01)
*G02B 26/10* (2006.01)
(Continued)

(52) U.S. Cl.
CPC ......... *G02B 27/0103* (2013.01); *G02B 26/12* (2013.01); *G02B 3/08* (2013.01);
(Continued)

(58) Field of Classification Search
CPC ...... G02B 27/0103; G02B 26/12; G02B 3/08; G02B 26/101; G02B 2027/0107;
(Continued)

(56) References Cited

U.S. PATENT DOCUMENTS 5,864,432 A * 1/1999 Deter .................. G02B 27/01
359/630
5,982,553 A 11/1999 Bloom et al.
(Continued)

FOREIGN PATENT DOCUMENTS

CN 101963703 A 2/2011
CN 203465469 U 3/2014
(Continued)

OTHER PUBLICATIONS

European Office Action dated Oct. 19, 2021 issued in related European Patent Application No. 16710193.0.

*Primary Examiner* — Magda Cruz
(74) *Attorney, Agent, or Firm* — Seyfarth Shaw LLP; Brian Michaelis

(57) ABSTRACT

An imaging apparatus has a plurality of light-emitting elements arranged in a first direction along a line for generating a plurality of modulated light beams wherein the plurality of light-emitting elements comprises a plurality of optical elements, which are arranged in the first direction, and a laser projector apparatus for scanning the optical elements in the first direction. A deflection apparatus is included for adjustably deflecting the plurality of modulated light beams in a second direction, wherein the second direction differs from the first direction; and wherein the deflection apparatus comprises a rotating element and the optical elements are arranged on the rotating element.

20 Claims, 6 Drawing Sheets

(51) Int. Cl.
  *G02B 27/01* (2006.01)
  *G02B 3/08* (2006.01)
(52) U.S. Cl.
  CPC .... *G02B 26/101* (2013.01); *G02B 2027/0107* (2013.01); *G02B 2027/013* (2013.01)
(58) Field of Classification Search
  CPC ........ G02B 2027/013; G02B 2027/011; G02B 26/10; G02B 13/14; G02F 1/29
  See application file for complete search history.

(56) References Cited

U.S. PATENT DOCUMENTS

| | | | |
|---|---|---|---|
| 6,580,529 | B1 | 6/2003 | Amitai et al. |
| 7,075,739 | B2 | 7/2006 | Mikhailov et al. |
| 8,233,204 | B1 | 7/2012 | Robbins et al. |
| 8,848,149 | B2 | 9/2014 | Liu et al. |
| 2002/0021346 | A1* | 2/2002 | Ishihara ................. G02B 26/12 347/250 |
| 2004/0100672 | A1* | 5/2004 | Yamamoto ............... B41J 2/471 359/208.1 |
| 2006/0171696 | A1* | 8/2006 | Murata .................. H04N 23/69 396/72 |
| 2006/0228073 | A1 | 10/2006 | Mukawa et al. |
| 2011/0109528 | A1 | 5/2011 | Mun et al. |
| 2011/0134017 | A1 | 6/2011 | Burke |
| 2013/0170007 | A1* | 7/2013 | Kurashige ............ G02B 26/101 359/24 |

FOREIGN PATENT DOCUMENTS

| | | | |
|---|---|---|---|
| CN | 104280885 A | 1/2015 | |
| DE | 19540108 C2 | 4/1997 | |
| DE | 10045980 A1 | 3/2001 | |
| DE | 102004001389 A1 * | 8/2005 | ........... H04N 9/3129 |
| DE | 102004001389 A1 | 8/2005 | |
| DE | 102011083662 A1 | 4/2013 | |
| JP | 2002162598 A | 6/2002 | |

* cited by examiner

DATA PROJECTION SYSTEM

CROSS-REFERENCE TO RELATED APPLICATION DATA

This application is a divisional of U.S. patent application Ser. No. 15/559,209 filed Sep. 18, 2017, which is a national stage of PCT/EP2016/055710 filed Mar. 16, 2016, which claims priority from German Patent Application No. 10 2015 104 085.9 filed Mar. 18, 2015, the contents of which are incorporated herein by reference.

BACKGROUND

The present application relates to devices for data projection, in particular for what are known as head-up displays (HUDs). The present application in particular relates to devices of this type that may be used in vehicles, in particular in motor vehicles.

SUMMARY

Devices for data projection are increasingly used to provide data to a user in a simple manner. The term "data" should here be understood in general terms, for example, projected data can comprise images, videos, symbols, characters and/or numbers.

One area of application of such devices for data projection is the automotive field, for example for providing data to a handler of a vehicle, for example a driver of a car, during driving. This can preferably be implemented in a region of a windshield of a vehicle, as a result of which the driver does not need to specifically direct his gaze to a display, for example of an instrument cluster, in order to obtain data, but can substantially perceive said data without substantially averting his gaze from the environment, for example a road. In this respect, holographic head-up displays are known, for example, in which data are provided via one or more holograms, or head-up displays with a projection surface, in which data are projected onto a projection surface that is arranged, for example, in the region of the windshield.

One example of a holographic head-up display is known, for example, from U.S. Pat. No. 4,832,427 A. That document describes an arrangement in which a content of a light-emitting display is coupled into a field of vision of a driver, as he is looking through a windshield toward the front, by way of two holograms. The second hologram, which permits, for example, partial view through the windshield and additionally viewing of the data, is also referred to as a combiner in the context of head-up displays. In the device described there, the driver additionally has the option of directly viewing the display through the first hologram.

U.S. Pat. No. 8,934,159 discloses a head-up display, in which a volume hologram is used as a combiner in a windshield. In addition, that document describes targeted matching of temperature dependences between quasi-monochromatic light sources and a material for the volume hologram.

A further head-up display is disclosed in WO 2014/193480. In the device described there, a mobile telephone having, for example, a TFT display is used as the imaging system. In that case, usually a relatively broad spectral distribution is implemented in each color channel used (e.g. red, green, blue), which can result in a dispersion-caused smear of the representation of an image content or, in the case of a high wavelength selectivity of the combiner in the windshield, in a poor energetic efficiency, since only a relatively small portion of the light emitted by the display passes from the combiner to the viewer. This can then result in a poor contrast and/or weak-light representation.

In the solutions just mentioned, generally use is made of the windshield at a relatively large angle as a deflection element for the optical beam path. In particular in modern vehicles, the windshield is typically curved. This can result in distortions in the representation, which can result in worse optical parameters of the device for data projection in particular at relatively large field angles.

A head-up display having a projection surface is known for example from US 2005/0140929 A1. That document describes a construction in which an image is projected onto a projection surface by way of a scanning laser projector. The projection surface can be, for example, a partially optically scattering region on a windshield. A similar device is also disclosed in WO 2014/115095.

A disadvantage of such conventional devices having a projection surface is the use of the generally (in particular in modern vehicles) non-planar windshield at a great angle as a projection surface. The spatial light distribution is produced here only on this projection surface. Owing to the shape of the projection surface, in particular because of the curved basic shape of the windshield, distortions in the representation occur when viewing a projected image from different directions. Furthermore, the site of the image thus viewed extends over an extended region in a direction away from a viewer or toward a viewer in particular in the case of inclined windshields in modern vehicles. This corresponds to a variation in the distance from the eye, such that a relatively large image cannot be seen with simultaneous sharpness. In addition, on account of the proximity to the viewer being too large, a projection surface in the windshield is in many cases not very ergonomic.

It is therefore an object of the present application to at least partially eliminate or alleviate the above-discussed disadvantages.

To this end, an imaging apparatus as claimed in claim 1, an optical component as claimed in claim 13, which can serve in particular as a combiner, and a device for data projection having such an imaging apparatus and such an optical component as claimed in claim 20 are provided. The dependent claims define further exemplary embodiments.

Provided according to a first aspect is an imaging apparatus, comprising a plurality of light-emitting elements, arranged along a line in a first direction, for generating a plurality of modulatable light beams and a deflection apparatus for the adjustable deflection of light beams in a second direction, with the second direction differing from the first direction. The second direction is here preferably substantially (e.g. in a range of +/−20 degrees, in particular in a range of +/−5 degrees) perpendicular to the first direction.

Such an imaging apparatus can be used to achieve efficient illumination of a corresponding optical component, for example a holographic component, which serves as a combiner.

The imaging apparatus can furthermore comprise an optical arrangement for collimating the light beams in the second direction.

At least one element of the optical arrangement can here serve as the deflection apparatus.

The optical arrangement can here comprise a cylindrical lens that extends in the first direction.

Additionally or alternatively, the optical arrangement can also comprise a liquid-crystal lens.

For implementing the deflection apparatus, a voltage profile which is applicable to the liquid-crystal lens can be spatially displaceable.

The plurality of light-emitting elements can here comprise a plurality of light source elements.

The light source elements can here comprise light-emitting diodes, organic light-emitting diodes, and/or lasers.

The plurality of light source elements can also comprise a plurality of optical elements that are arranged in the first direction and a laser projector apparatus, or a plurality of laser projector apparatuses, for scanning the optical elements in the first direction.

The deflection apparatus can comprise a rotating element, wherein the optical elements are arranged on the rotating element.

The rotating element can comprise here a star-shaped or polygonal cross section.

According to a second aspect, an optical component for a device for data projection comprises a carrier, a first hologram, arranged on a first side of the carrier (e.g. a single first hologram or a plurality of laterally offset first holograms that may be of similar configuration), for coupling light into the carrier, wherein the carrier is adapted to operate as a waveguide for the coupled-in light, and at least one second hologram. The at least one second hologram can here serve in particular for the coupling out. Each hologram of the at least one second hologram can be assigned to the first hologram or a respective one of the plurality of laterally offset first holograms.

Having an optical component of this type, the windshield can serve at least partially as a light guide, which can result in, for example, more favorable angles than in the case of projection onto a projection surface.

The carrier can in this case comprise a windshield.

The first hologram can be in particular a transmission hologram.

The at least one second hologram of the component can then comprise a further transmission hologram for coupling out light on the carrier, which is arranged on the first side of the carrier.

The transmission hologram and the further transmission hologram can here be arranged at different sites of the carrier.

However, the transmission hologram and the further transmission hologram can also be arranged to overlap completely or partially.

The at least one second hologram of the component can also comprise a reflection hologram, which is arranged on a second side of the carrier that is opposite the first side.

In the abovementioned cases, in which the first hologram is a transmission hologram, the first side can in particular be a side of the carrier that is to be arranged so as to face toward a viewer.

The first hologram can also be a reflection hologram. In this case, the at least one second hologram can likewise comprise a reflection hologram arranged on the first side of the carrier. The first side can in this case be a side of the carrier that is to be arranged so as to face away from the viewer.

The use of two reflection holograms is possible in particular in the case of the use of light sources with a small spectral line width.

The component can also comprise a plurality of first holograms, which serve in particular for coupling in, and a plurality of second holograms. An entire image area can in this case be made up of a matrix of locally geometrically optically adapted hologram pairs.

Provided according to a third aspect is a device for data projection which comprises an illumination apparatus, as described above, and a component, as described above, wherein the component is arranged to receive light from the imaging apparatus.

The device can furthermore comprise an element for splitting light beams, which is arranged between the imaging apparatus and the component.

In a device of this kind, for example an influence of a shape of the windshield on the optical transmission of an image content with data that are to be projected can be compensated for.

BRIEF DESCRIPTION OF THE DRAWINGS

Exemplary embodiments of the present invention will be explained in more detail below with reference to the attached drawings, in which.

DETAILED DESCRIPTION

Various exemplary embodiments of the present invention will be explained in detail below. These exemplary embodiments serve only for illustrative purposes and are not to be interpreted as being limiting. By way of example, a description of an exemplary embodiment having a plurality of features or elements should not be interpreted as meaning that all these features or elements are necessary for the implementation of the invention. Rather, it is possible for other exemplary embodiments to have fewer features or elements, and/or features or elements of the described or illustrated exemplary embodiments can be replaced by alternative features or elements. Moreover, further features or elements, in addition to those which are explicitly illustrated and described, can also be provided. Unless specified otherwise, features or elements of different exemplary embodiments can be combined with one another. Modifications and changes that are described for one of the exemplary embodiments can also be applicable to other exemplary embodiments.

First, exemplary embodiments of imaging apparatuses will be explained with reference to FIGS. 1 and 2, which exemplary embodiments can then be used in devices for data projection according to the invention.

Generally, in exemplary embodiments of imaging apparatuses, a combination of a light-emitting line, i.e. a one-dimensional, in particular regular, arrangement of individually controllable and addressable light-emitting elements, also referred to as light-emitting pixels, is used, which are arranged in a first direction, with a deflection unit acting in a second direction, which is substantially perpendicular thereto, is used. The above-mentioned light-emitting line can be formed, for example, a one-dimensional, regular or irregular arrangement of a plurality of controllable light-emitting pixels. The light-emitting pixels can, in preferred exemplary embodiments, emit light of substantially the same wavelength (for example for monochromatic representation) or can emit light correspondingly to a plurality of narrow wavelength ranges (for example a range in the red, a range in the blue, and a range in the green range) for a colored representation. For example, an irregular ("chirped") arrangement can be used to entirely or partially correct distortions of subsequent optical components, e.g. a windshield.

Figure 1:
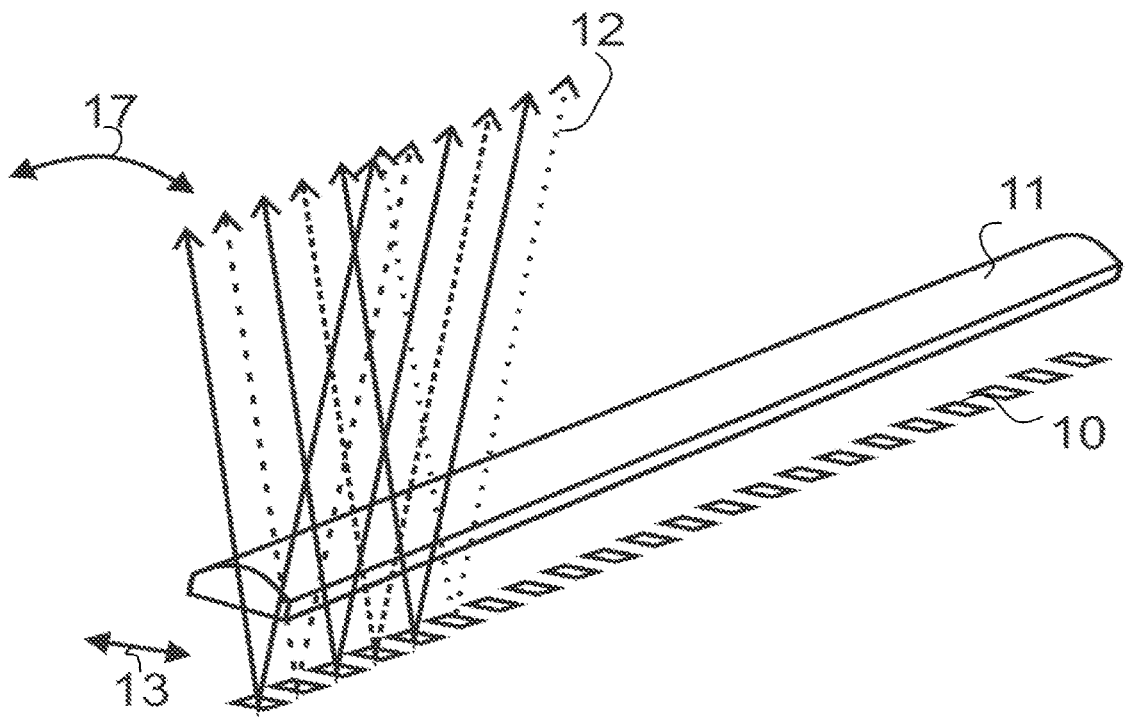
FIG. 1 shows an imaging apparatus according to an exemplary embodiment.

A first exemplary embodiment of a device like this is illustrated in FIG. 1. The exemplary embodiment of FIG. 1 comprises a plurality of light source elements 10, which are arranged in a first direction in one line. The number of the illustrated light source elements 10 serves merely as an example, and in particular it is possible to provide a significantly higher number of light source elements 10 (for example several hundred, or more than 1000 light source elements) in order to achieve a corresponding resolution in the first direction. The light source elements can comprise, for example, laser light sources, for example an arrangement of diode lasers or other semiconductor lasers, or can also comprise other light source elements, such as light-emitting diodes (LEDs) or organic light-emitting diodes (OLEDs). If the light source element used is not naturally narrowband (as is the case, for example, with some lasers), additional measures for changing the spectral bandwidth can be provided, for example optical filters or holograms. In some exemplary embodiments, all light source elements 10 can substantially have the same wavelength. In other exemplary embodiments, the light source elements 10 can include a plurality of different light source elements having different wavelengths. By way of example, light source elements having a wavelength in the blue range, light source elements having a wavelength in the green range, and light source elements having a wavelength in the red range can be arranged in alternation in order to permit representation of colored images. Furthermore, light source elements of different colors in two dimensions at an angle with respect to the first direction, or longitudinal axis, can be displaced such that effects on the imaging caused by grating dispersion can be reduced.

The light source elements 10, which preferably spatially have a small extent, are then collimated using a suitable optical arrangement in a second direction at an angle with respect to the direction of the line of light source elements 10. FIG. 1 illustrates an aberration-corrected cylindrical lens 11 as an example of such an optical arrangement. However, this is only an example, and it is also possible to use other optical elements and/or an optical arrangement having more than one element. By moving the cylindrical lens 11 in a second direction at an angle with respect to the first direction (line direction), as indicated by an arrow 13, it is possible to deflect light beams 12, coming from the light source elements 10, within a specific angle range 17, with which ultimately a two-dimensional image can be generated. The angle range 17 can be for example a range of approximately 5°. The movement in the direction of the arrow 13 can here be performed at a relatively high frequency, for example 25 Hz, 50 Hz or more, in order to generate a correspondingly high frame rate.

The aberration-corrected cylindrical lens 11 is merely one example of an optical arrangement, which in this case simultaneously serves as a deflection apparatus (by way of the movement according to the arrow 13). In other exemplary embodiments, other optical arrangements can be used for this purpose. One example of such an optical arrangement which can substantially replace the cylindrical lens 11 of FIG. 1 will now be discussed with reference to FIGS. 6A-6C.

Figure 6A:
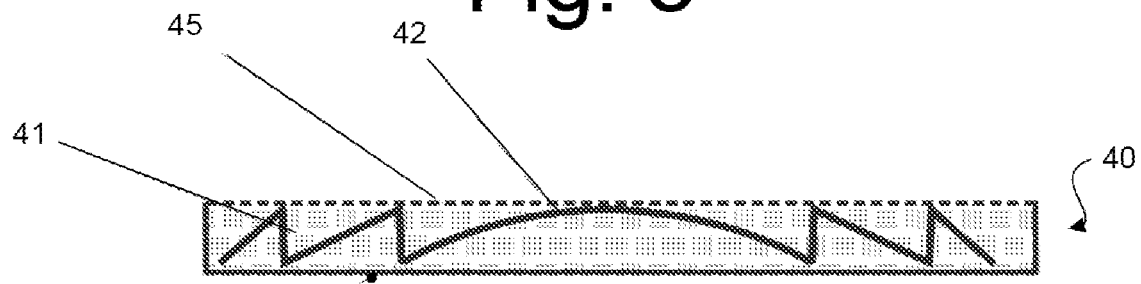
FIGS. 6A to 6C show illustrations for explaining an alternative deflection apparatus for exemplary embodiments of imaging apparatuses.
Figure 6B:
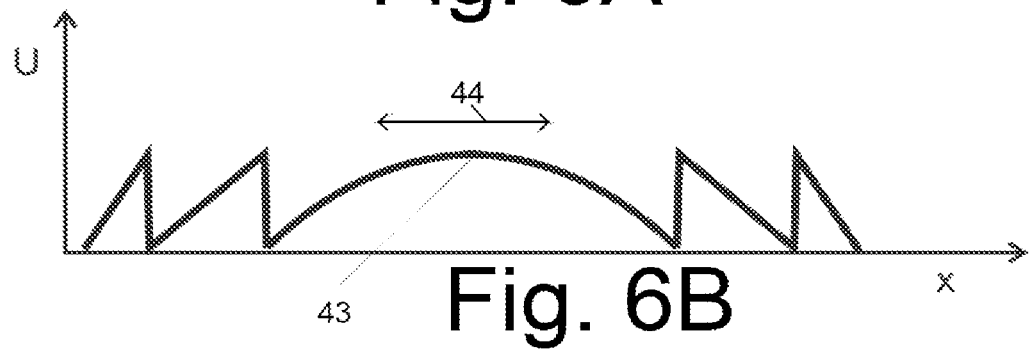
Figure 6C:
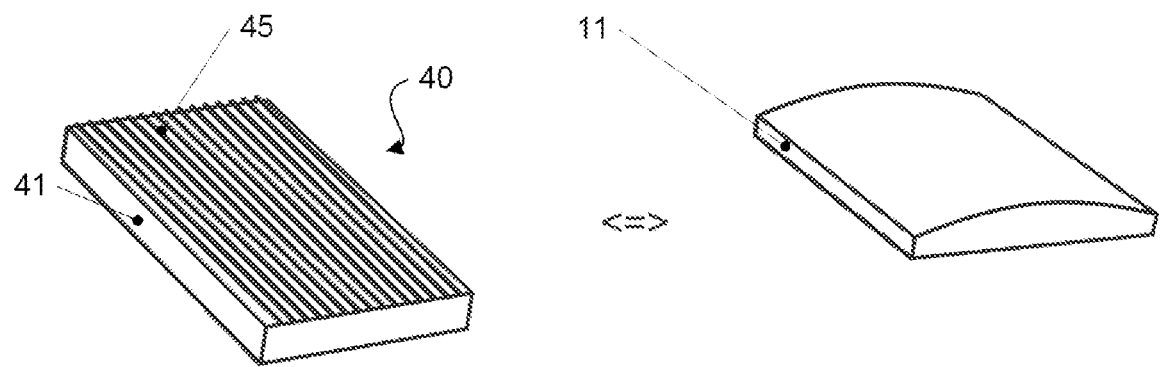

FIGS. 6A-6C show illustrations for explaining a function of a liquid-crystal lens 40, which is in particular controllable for fulfilling a function corresponding to the function of the cylindrical lens 11.

FIG. 6A shows a cross-sectional view of the liquid-crystal lens 40, which is able to be used, for example, instead of the cylindrical lens 11 in the exemplary embodiment of FIG. 1. The liquid-crystal lens 40 comprises liquid crystals 41 and a stripe-type electrode structure 45, which is applied on a surface of the liquid-crystal lens 40. A corresponding counter electrode 46 can be applied on the opposite side.

The electrodes 45 can by way of example have a period <50 μm or another desired period which is necessary in order to sufficiently exactly approximate a desired lens function. The counter electrode 46 can likewise be structured or have a full-area configuration. The electrodes 45, 46 are in this case configured to be transparent.

FIG. 6C shows a perspective view of the liquid-crystal lens 40 as compared to a cylindrical lens such as the cylindrical lens 11.

In such liquid-crystal lenses, a desired refractive power distribution is generated by applying a voltage profile to the electrode structure 45. FIG. 6 shows, as an example, a refractive index profile 42 of a one-dimensional Fresnel lens or a Fresnel cylindrical lens, which can substantially correspond to the cylindrical lens 11 from FIG. 1, for example with respect to their optical function.

Such a refractive index profile can be generated for example by applying a voltage profile 43, as is illustrated in FIG. 6B, to the electrode structure 45. FIG. 6B here shows the voltage U in an x-direction, which is likewise shown in FIG. 6A. The voltage U can substantially be constant in the direction of the stripes of the stripe-shaped electrodes 45, which then, in the illustrated example, gives the function of an elongate cylindrical lens corresponding to the cylindrical lens 11.

Such a liquid-crystal lens 40 operates according to the principle of a phase-only spatial light modulator (SLM). In such light modulators, it is merely an optical density that is locally varied by applying the voltage, and not, as for example in liquid-crystal display elements, the transmittance. Due to technological boundary conditions of such liquid-crystal lenses, which result in a possible optical delay which can typically be significantly below that of a conventional lens, the use of a Fresnel lens structure, as illustrated in FIG. 6A, is typically necessary for realizing a desired lens function. However, if the delays and optical boundary conditions permit, the use of other lens structures is in principle also possible.

In that case, no mechanical movement of the lens needs to be performed for implementing a deflection function, as was described for the cylindrical lens 11 in FIG. 1 (according to the arrow 13), but a corresponding functionality can be achieved by displacing the voltage profile in the x-direction according to an arrow 44 in FIG. 6B. This also displaces the refractive index distribution 42 in the x-direction, which substantially has the same effect as the mechanical movement of the lens 11. Such a displacement of the voltage applied and thus of the field strength distribution can be performed very quickly, for example at up to a few kilohertz, such that the partially serial image formation owing to the deflection is not perceivable by the viewer.

The illustrations in FIGS. 6A-6C are merely schematic illustrations for explaining the principle function of a liquid-crystal lens and the application thereof in exemplary embodiments of imaging apparatuses. The concrete implementation can then occur as necessary for a respectively used liquid-crystal lens. By way of example, it may be necessary, depending on the liquid crystals 41 used, for the voltage distribution to be inversely proportional to a desired refractive index distribution, with the result that the illustration of FIG. 6B should not be interpreted as being limiting, but merely as serving illustrative purposes. In addition, in some exemplary embodiments, it is not DC voltage, but AC voltage at a high frequency (for example significantly greater than the deflection frequency) that is used as the voltage, wherein in this case the curve 43 illustrates an amplitude distribution of such an AC voltage. The use of such AC voltage can prevent, for example, that drift movements are triggered in the liquid crystals 41.

In other exemplary embodiments, in addition or alternatively to the movement of the cylindrical lens 11, as shown in FIG. 1, or additionally or alternatively to a different optical element, like the liquid-crystal lens 40 described with reference to FIGS. 6A-6C, a deflection by way of a separate deflection element, for example an element having mirrors, can be used. Such a deflection element having mirrors will also be explained below in more detail with reference to FIG. 2.

Figure 2:
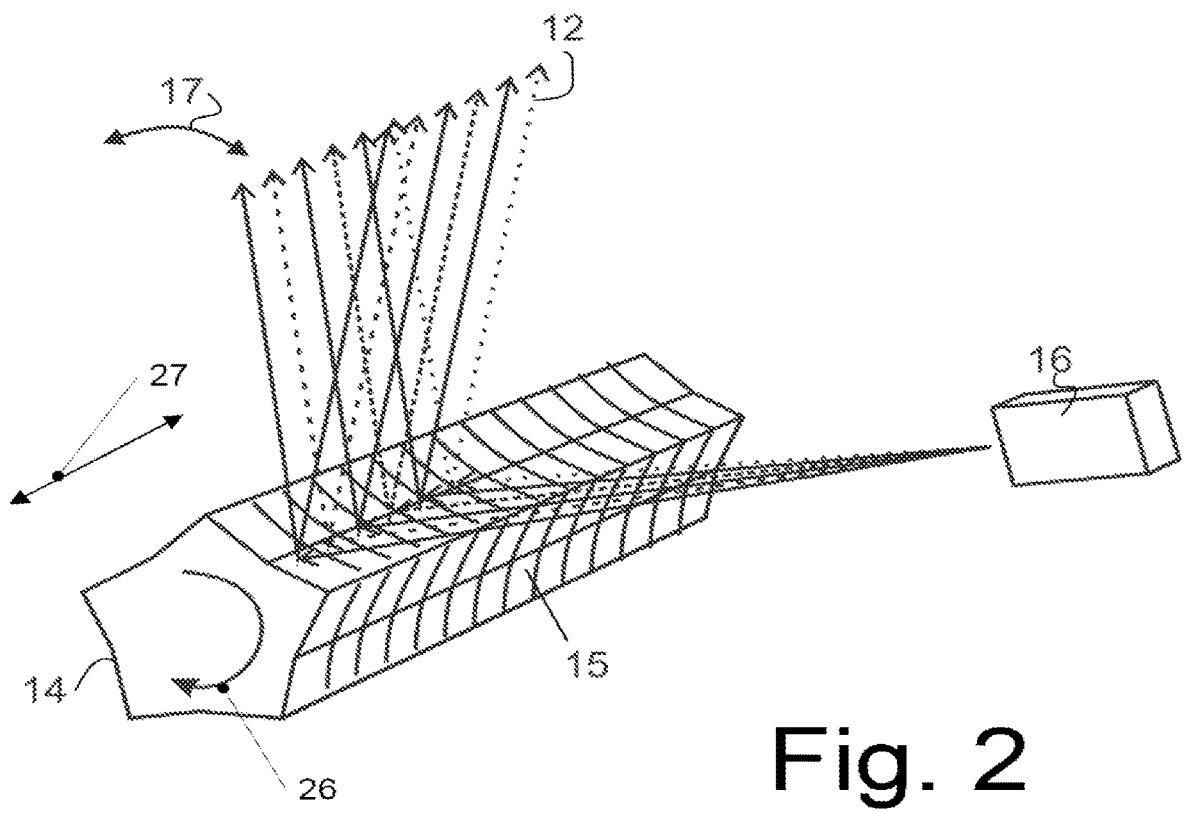
FIG. 2 shows an imaging apparatus according to a further exemplary embodiment.

FIG. 2 shows a further exemplary embodiment of an imaging apparatus according to the invention. The exemplary embodiment of FIG. 2 comprises a laser projector 16, which comprises one or more laser light sources in combination with respectively assigned collimation and deflection units. Such laser projectors can be configured in a conventional manner, for example as a conventional laser scanner or a conventional pocket laser projector.

In an imaging apparatus for a monochromatic representation, the laser projector 16 can have, for example, a single laser light source having a corresponding color. For colored representation, the laser projector 16 can have, for example, a laser light source for every desired color, for example a red, a blue, and a green laser light source.

The laser projector 16 permits deflection of the laser beams in a first direction onto a plurality of optical elements 15, which are arranged on a roller-type deflection apparatus 14. The optical elements 15 can be, for example, reflective optical elements having a shape such that an incident laser beam is expanded in the direction of a longitudinal axis of the deflection apparatus 14. This can be achieved for example by way of a corresponding mirror shape of the optical elements 15. The laser projector 16 then scans the optical elements 15 in the longitudinal direction 27 (first direction) of the deflection apparatus 14. In this way, similar to the exemplary embodiment of FIG. 1, a light-emitting line is effectively formed in the longitudinal direction 27, which in the end effectively corresponds to a light source arrangement similar to that of FIG. 10.

The deflection apparatus 14 in addition rotates about its longitudinal axis (corresponding to the direction 27), as indicated by an arrow 26, for example at a high speed in the range of 1000 rpm. The deflection apparatus 14 has, as illustrated, a star-shaped cross section, which causes the light beams 12 to be deflected in an angle range 17 upon rotation of the deflection apparatus 14. The angle range is here substantially determined by way of the cross-sectional shape of the deflection apparatus 14. At the same time, a periodic displacement of the effective source points at an angle with respect to the longitudinal axis results from the rotational movement, with the result that, averaged over time, a two-dimensional light-emitting distribution is obtained. The number of optical elements 15 here merely serves as an example, and in particular significantly more optical elements 15 can be provided, in accordance with a desired resolution of an image to be generated. It is also possible to use other cross-sectional shapes of the deflection apparatus 14, for example a polygonal (triangular, rectangular, pentagonal etc.) cross section.

As already mentioned, the optical elements 15 can expand a respectively arriving laser beam in the longitudinal direction 27, which creates a defined aperture angle for providing a suitable pupil distribution for each source point, i.e. each optical element 15, and can collimate it at an angle with respect thereto, with the result that the beam that is reflected by the deflection apparatus 14 (or the reflected beam bundle) propagates parallel with respect to the deflection direction corresponding to the angle 17.

The optical elements 15 can be arranged regularly or irregularly, as described above for the light source elements 10. Each optical element 15 corresponds to the origin of a light source point and thus serves, together with the laser projector 17, as a light-emitting element, which thus implements a function similar to the light source elements 10 from FIG. 1.

For generating an image, the imaging apparatuses of FIG. 1 or 2 can then be controlled such that the illumination in the line direction is modulated depending on the image to be represented (modulation of the light sources 10 or of the laser beam of the laser projector 16). In this way, illumination according to a desired image, for example according to desired data to be projected, can be implemented.

In imaging apparatuses according to the invention, as explained with reference to FIG. 1 and FIG. 2, it is preferred for the radiation of individual light-emitting pixels (for example of individual light source elements 10 or beams coming from the individual optical elements 15) not to be coherent, with the result that no interference phenomena among the individual radiation paths occurs. It is furthermore preferred for the coherence time of the light sources not to exceed a specific value, for example 1-5 mm, in order to suppress interference effects in downstream optical components, for example a combiner. In some exemplary embodiments, partial reduction of these effects is achieved by way of the moving deflection unit also for sources having a greater time coherence.

With respect to FIGS. 3 and 4, devices for data projection, which are able to be used in particular in vehicles, will now be explained.

Figure 3:
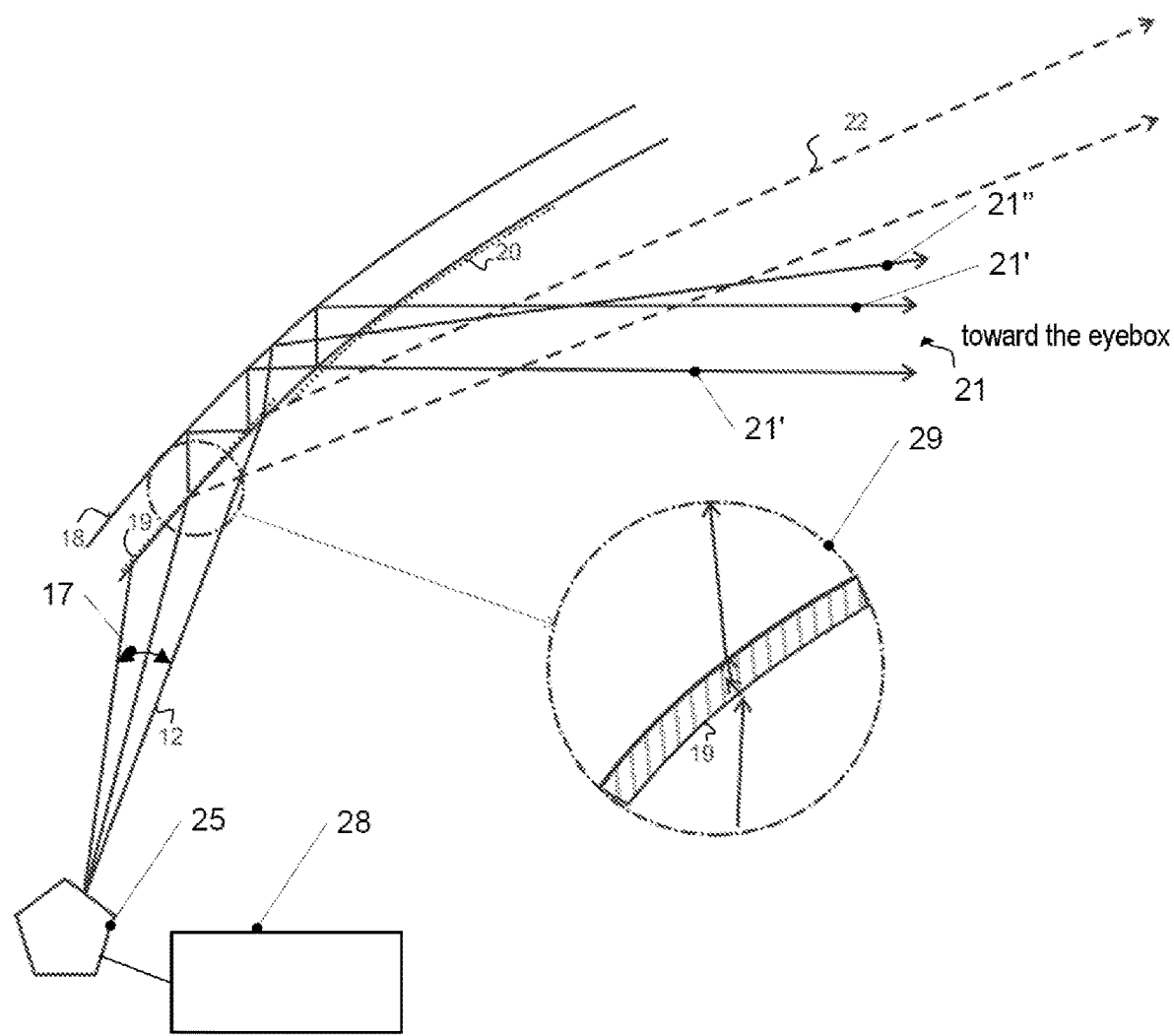
FIG. 3 shows a device for data projection according to an exemplary embodiment.

The exemplary embodiment of FIG. 3 comprises an imaging apparatus 25, which has light-emitting elements arranged, along a line, perpendicular to the image plane of FIG. 3, for example light source elements or elements that emit light formed by reflection at individual optical elements. By way of example, the imaging apparatus 25 can be configured as explained with reference to FIG. 1 or 2. In the case of FIG. 1, the direction of the light source elements 10 is then perpendicular to the drawing plane of FIG. 3, and in the case of FIG. 2, the direction 27 is perpendicular to the drawing plane of FIG. 3. The imaging apparatus 25 in the exemplary embodiment of FIG. 3 is controlled by way of a controller 28, which controls the imaging apparatus 25 to modulate light beams 12 corresponding to data to be projected, i.e. corresponding to an image to be represented. The light beams 12 are deflected by way of the in an angle range 17, as already explained with reference to FIGS. 1 and 2, to permit representation of a two-dimensional image.

The light beams 17 are then incident on a carrier 18, for example a windshield. In a region in which the light beams 12 are incident on the carrier 18, the carrier in the exemplary embodiment of FIG. 3 is provided with an input-coupling hologram 19. The input coupling hologram 19 can be, for example, a transmission volume hologram, for example in the form of an optical grating. One effect of the input coupling hologram 19 is illustrated in enlarged fashion in a circle 29. In particular, an angle of the light beam which is incident on the carrier 18 is changed here, and a comparatively large portion of the light beam is coupled into the carrier 18. The carrier 18 acts, as illustrated, as a waveguide for the corresponding angles, wherein the light beams are then directed toward a region of the windshield 18 in which the windshield 18 is provided with an output coupling hologram 29. The output coupling hologram 20 in turn can be a transmission volume hologram and be configured in the form of an optical grating.

In the output coupling hologram 20, in each case a portion of the light conducted in the carrier 18 is then coupled out, while a different portion can be reflected again and be coupled out at a different site. This is shown in FIG. 3 for two coupled-out beams 21', while a coupled-out beam 21" originates from a light beam 12 of a different direction and thus also has a different direction after being coupled out.

22 designates a beam reflected at the carrier 18, which will not be used further. The intensity of such a reflected beam can, in some exemplary embodiments, be reduced by way of an anti-reflective coating of the carrier 18.

The output coupling hologram 20 can in particular be configured such that it at least partially compensates for distortions and/or aberrations which are caused by a curvature of the carrier 18 (for example windshield). The principle shown with an input coupling hologram and output coupling hologram is, to a certain degree, tolerant with respect to vertically differing angles (for example angle range 17). This angle range is used for representing the data to be projected.

To expand a usable field angle beyond the possible angle range of the device of FIG. 3, it is also possible for an arrangement having an input coupling hologram and output coupling hologram to be arranged several times one above the other in or on the carrier 18. Beam traps can be provided here, with the result that light of an upstream optical arrangement of this type after total internal reflection does not crosstalk over the arrangement that follows.

In a further exemplary embodiment, a holographic reflection element can be arranged for example in an embedded plastics layer in the carrier 18, which permits additional splitting of the illustrated beam path. This can result in a more homogeneous filling of a pupil distribution.

Figure 4:
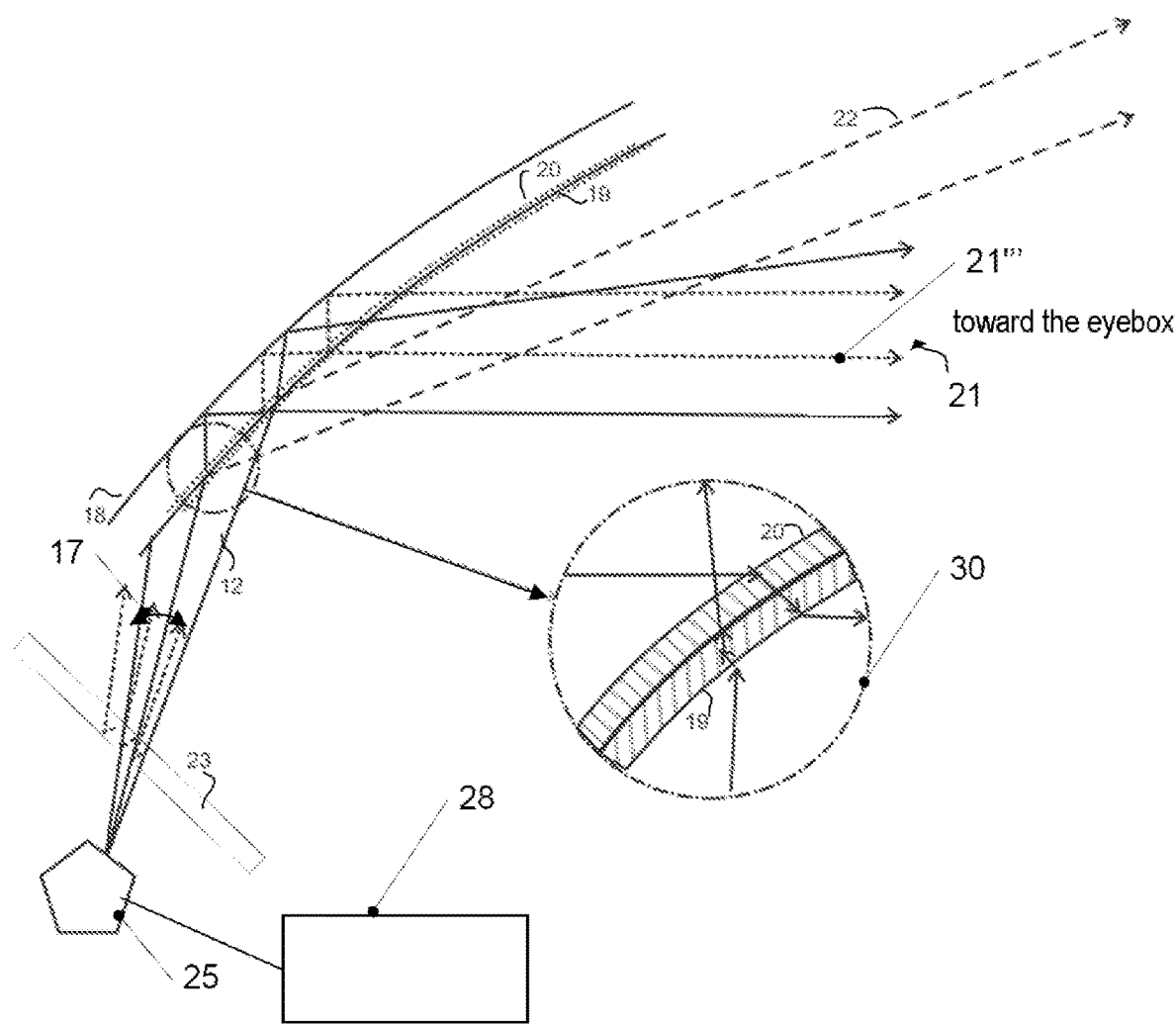
FIG. 4 shows a device for data projection according to a further exemplary embodiment.

FIG. 4 illustrates a further exemplary embodiment of a device for data projection according to an exemplary embodiment. The exemplary embodiment of FIG. 4 is a modification of the exemplary embodiment of FIG. 3, and identical or mutually corresponding elements are designated with the same reference signs. To avoid repetition, only the differences between FIG. 4 and FIG. 3 will therefore be explained in detail. Aside from the differences explained below, the explanations for FIG. 3 also apply to FIG. 4.

In the exemplary embodiment of FIG. 4, the input coupling hologram 19 and the output coupling hologram 20 are arranged together over a large region of the carrier 18 so as to overlap, i.e. not spatially offset as in the exemplary embodiment of FIG. 3.

In the exemplary embodiment of FIG. 3, the beams (bundles) 12 reach a specific region of the carrier with the input coupling hologram 19 within a specific time interval. This changes the coupling in and coupling out, as is illustrated in an enlarged region 30. In addition, in the exemplary embodiment of FIG. 4, an additional element 23 for the vertical pupil splitting is provided, which splits for example, as illustrated, each beam 12 into a plurality of parallel beams (bundles) by way of internal reflection. The beam bundles 12 are thus multiplied by the element 23 and projected, with an offset, onto the carrier 18 with the input coupling hologram 19 and the output coupling hologram 20. Improved filling of a pupil is achieved by way of the element 23, i.e. more light beams having the same direction are coupled out with a local offset, as is illustrated, by way of example, by way of a light beam 21" in FIG. 4. In some exemplary embodiments, the bundle width of beams offset in parallel is here limited such that no strong image errors occur due to an excessively large addressed region on the combiner (e.g. carrier 18 with holograms).

An element like the element 23 can here also be provided in the exemplary embodiment of FIG. 3.

By way of the distribution of the input coupling hologram 19 and the output coupling hologram 20 over a large region of the windshield, as in FIG. 4, the output coupling hologram 20 is configured with preference, for ensuring a good point image, such that a high coupling-out efficiency (for example 80% . . . 90%) a relatively small number of multiple reflections 21''' occur.

Figure 5:
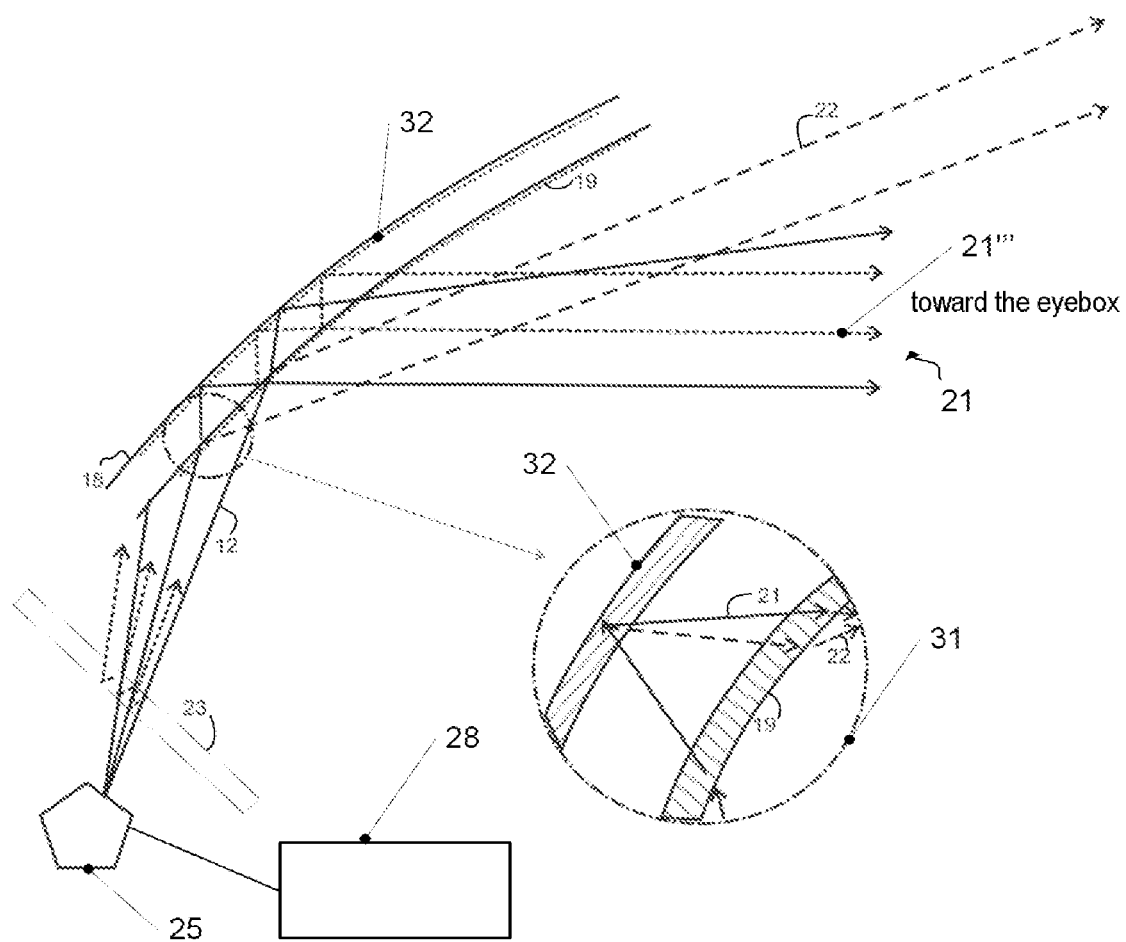
FIG. 5 shows a device for data projection according to a further exemplary embodiment.

In other exemplary embodiments, a reflection hologram can be provided instead of or in addition to the output coupling hologram 20 which is configured in particular as a transmission hologram. A corresponding exemplary embodiment is illustrated in FIG. 5. FIG. 5 is here a modification of the exemplary embodiment of FIG. 4, in which the output coupling hologram 20, which operates as a transmission hologram, has been replaced by a reflection hologram 32. In other exemplary embodiments, the reflection hologram 32 can additionally be provided in addition to the output coupling hologram 20. The reflection hologram 32 in the illustrated example is arranged on an opposite side of the carrier 18 as compared to the input coupling hologram 19.

An enlarged section 31 shows the beam path. Spectral narrowing can occur by way of the reflection hologram 32, in particular in some exemplary embodiments, by only radiation of a narrow spectral range being reflected, while the reflection hologram 32 is transmissive for radiation of different wavelengths. This can be useful in particular if light sources having a comparatively large bandwidth are used, such as light-emitting diodes or organic light-emitting diodes, for example as light source elements 10 in FIG. 1. In such a case, it is possible, for example, for a spectrally narrowing reflection hologram to be reduced or avoided smearing of a point image to be represented owing to an effect of a dispersion of refractive hologram structures such as the input coupling hologram 19. The reason herefor in this case is the wavelength dependence of the reflectance of the (thick) reflection hologram (Bragg grating), which is strong at least in some reflection holograms, in particular thick reflection holograms, corresponding to a comparatively narrow so-called acceptance spectrum. The acceptance spectrum of a transmission hologram, on the other hand, is typically comparatively broad, which effects the transmission of broad spectra (danger of smearing, as described above). The typically small acceptance angle of a transmission hologram, on the other hand, effects a clean separation of the beam paths of unused and used light.

While the exemplary embodiment of FIG. 5 was illustrated as a modification of the exemplary embodiment of FIG. 4, a similar modification, i.e. provision of a reflection hologram, can also take place in the exemplary embodiment of FIG. 3.

Figure 7:
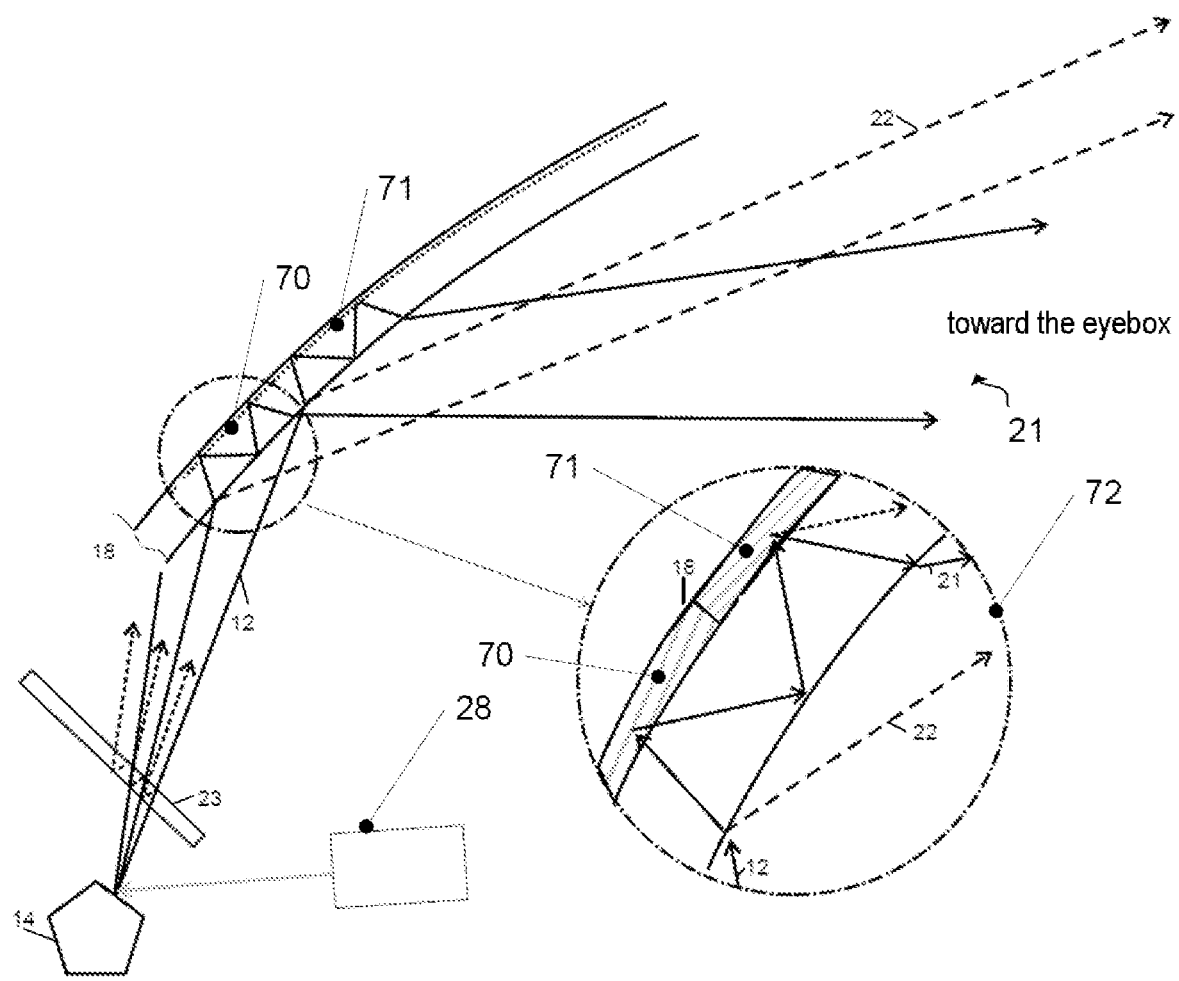
FIG. 7 shows a device for data projection according to a further exemplary embodiment.

A further modification is illustrated in FIG. 7. Again, components and elements which have already been explained with reference to FIGS. 3-5 carry the same reference signs and will not be explained again in detail.

In the exemplary embodiment of FIG. 7, reflection holograms serve both for coupling the light into the carrier 18 and for coupling light out of the carrier 18. In particular, a first reflection hologram 70 serves for coupling the beams 12 in, and a second reflection hologram serves for coupling out the light. The first reflection hologram 70 and the second reflection hologram 71 can here be arranged one next to the other, in overlapping fashion or in alternation on a side of the carrier 18 that faces away from a viewer.

One section 72 shows an example of a possible beam path. A beam 12 is incident on the carrier 18 at an angle such that at least a portion of the beam penetrates the carrier and is incident on the first reflection hologram 70. Another portion of the beam 12 can be reflected in the form of the beam 22.

The first reflection hologram 70 changes the angle of the beam such that total internal reflection occurs in the carrier 18 until the beam is incident on the second reflection hologram 71. Here again the angle of the beam (or of a largest portion thereof) is changed such that no more total internal reflection occurs, but the beam (or a portion thereof) is coupled out of the carrier 18 in the form of the beam 21. The respective reflection angles of the holograms 70, 71 are settable here by way of the design of the holograms.

The device of FIG. 7 having two reflection holograms 70, 71 is suitable in particular for comparatively narrow-band light sources, since typical reflection holograms operate in a specific wavelength range, but the angles vary in wavelength-dependent fashion. As a result, an unsharp or smeared reproduction of the data to be projected can occur in relatively broadband light sources.

With the exemplary embodiments illustrated, display of data to be projected in the form of a changing brightness distribution is made possible by the beam bundles 12 which are generated by an imaging apparatus. The changing brightness distribution can be performed by modulating brightnesses of individual light-emitting elements such as the light sources 10 of FIG. 1 or by modulation of the brightness of a scanning laser beam, like the beam generated by the projector 16 in FIG. 2. The combination of the thus controllable light-emitting line and a beam deflection in the angle range 17 permits the implementation of data projection also such that a viewer, e.g. a driver, perceives the data to be projected at a specific distance from the carrier 18 together with environment information.

In the illustrated exemplary embodiments, the carrier 18 can here be used locally as a waveguide over a specific distance, which implements a specific additional optical propagation length between coupling light into and out of the carrier. This produces an additional degree of freedom for local aberration corrections.

Owing to the exemplary embodiments of FIGS. 1 and 2, a compact imaging apparatus can be produced, which, together with the illustrated exemplary embodiments of combiners (carrier 18) together with the holograms (19, 70, 20, 32 and/or 71), directs the radiation generated by the imaging apparatus to a viewer such that this viewer can view the data to be projected.

The exemplary embodiments illustrated are to be understood merely as examples, and what was said before means that different variations and modifications are possible.

What is claimed is:

1. An imaging apparatus, comprising:
   a plurality of light-emitting elements arranged in a first direction along a line for generating a plurality of modulated light beams;
      wherein the plurality of light-emitting elements comprises a plurality of optical elements, which are arranged in the first direction, and a laser projector apparatus for scanning the optical elements in the first direction;
   a deflection apparatus for adjustably deflecting the plurality of modulated light beams in a second direction, wherein the second direction differs from the first direction; and
      wherein the deflection apparatus comprises a rotating element and the optical elements are arranged on the rotating element.

2. The imaging apparatus as claimed in claim 1, wherein the second direction is substantially perpendicular to the first direction.

3. The imaging apparatus as claimed in claim 1, further comprising an optical arrangement for collimating the plurality of modulated light beams in the second direction.

4. The imaging apparatus as claimed in claim 3, wherein at least one element of the optical arrangement serves as the deflection apparatus.

5. The imaging apparatus as claimed in claim 3, wherein the optical arrangement comprises a cylindrical lens extending in the first direction.

6. The imaging apparatus as claimed in claim 3, wherein the optical arrangement comprises a liquid-crystal lens.

7. The imaging apparatus as claimed in claim 6, further including an electrode structure wherein a voltage profile which is applicable to the liquid-crystal lens is spatially displaceable for implementing the deflection apparatus.

8. The imaging apparatus as claimed in claim 1, wherein the plurality of light-emitting elements comprises a plurality of light source elements.

9. The imaging apparatus as claimed in claim 8, wherein the plurality of light source elements comprises one of: a plurality of light-emitting diodes, a plurality of organic light-emitting diodes, and a plurality of lasers.

10. The imaging apparatus as claimed in claim 1, wherein the rotating element comprises a star-shaped or polygonal cross section.

11. An imaging apparatus, comprising:
    a plurality of light-emitting elements arranged in a first direction along a line for generating a plurality of modulated light beams;
    a deflection apparatus for adjustably deflecting the plurality of modulated light beams in a second direction, wherein the second direction differs from the first direction; and
    an optical arrangement comprising a liquid-crystal lens for collimating the plurality of modulated light beams in the second direction.

12. The imaging apparatus as claimed in claim 11, wherein the second direction is substantially perpendicular to the first direction.

13. The imaging apparatus as claimed in claim 11, wherein the optical arrangement comprises a cylindrical lens extending in the first direction.

14. The imaging apparatus as claimed in claim 11, wherein the plurality of light-emitting elements comprises a plurality of light source elements.

15. The imaging apparatus as claimed in claim 14, wherein the plurality of light source elements comprises one of: a plurality of light-emitting diodes, a plurality of organic light-emitting diodes, and a plurality of lasers.

16. The imaging apparatus as claimed in claim 11, further comprising a rotating element that comprises a polygonal cross section.

17. An imaging apparatus, comprising:
- a plurality of light-emitting elements arranged in a first direction along a line for generating a plurality of modulated light beams;
- a deflection apparatus for adjustably deflecting the plurality of modulated light beams in a second direction, wherein the second direction differs from the first direction;
- an optical arrangement comprising a liquid-crystal lens for collimating the plurality of modulated light beams in the second direction; and further including an electrode structure wherein a voltage profile which is applicable to the liquid-crystal lens is spatially displaceable for implementing the deflection apparatus.

18. The imaging apparatus as claimed in claim 17, wherein the second direction is substantially perpendicular to the first direction.

19. The imaging apparatus as claimed in claim 17, wherein the plurality of light-emitting elements comprises a plurality of light source elements.

20. The imaging apparatus as claimed in claim 19, wherein the plurality of light source elements comprises one of: a plurality of light-emitting diodes, a plurality of organic light-emitting diodes, and a plurality of lasers.

* * * * *

UNITED STATES PATENT AND TRADEMARK OFFICE
CERTIFICATE OF CORRECTION

PATENT NO. : 12,032,160 B2
APPLICATION NO. : 17/202491
DATED : July 9, 2024
INVENTOR(S) : Matthias Burkhardt et al.

It is certified that error appears in the above-identified patent and that said Letters Patent is hereby corrected as shown below:

In the Specification

Column 4, Line 64 delete ", is used";

Column 6, Line 28 change "FIG. 6" to --FIG. 6A--;

Column 6, Line 36 change "x-direction" to --y-direction--;

Column 7, Line 56 change "FIG. 10" to --FIG. 1--;

Column 8, Line 23 change "17" to --16--;

Column 8, Line 43 delete "by way of the";

Column 9, Line 1 change "17" to --12--;

Column 9, Line 16 change "29" to --20--;

Column 10, Line 13 change "21"" to --21--;

Column 10, Line 51 change "avoided" to --avoid--; and

Column 11, Line 12 change "second reflection hologram" to --second reflection hologram 71--.

Signed and Sealed this
Seventeenth Day of September, 2024

*Katherine Kelly Vidal*
*Director of the United States Patent and Trademark Office*